Figure 1:
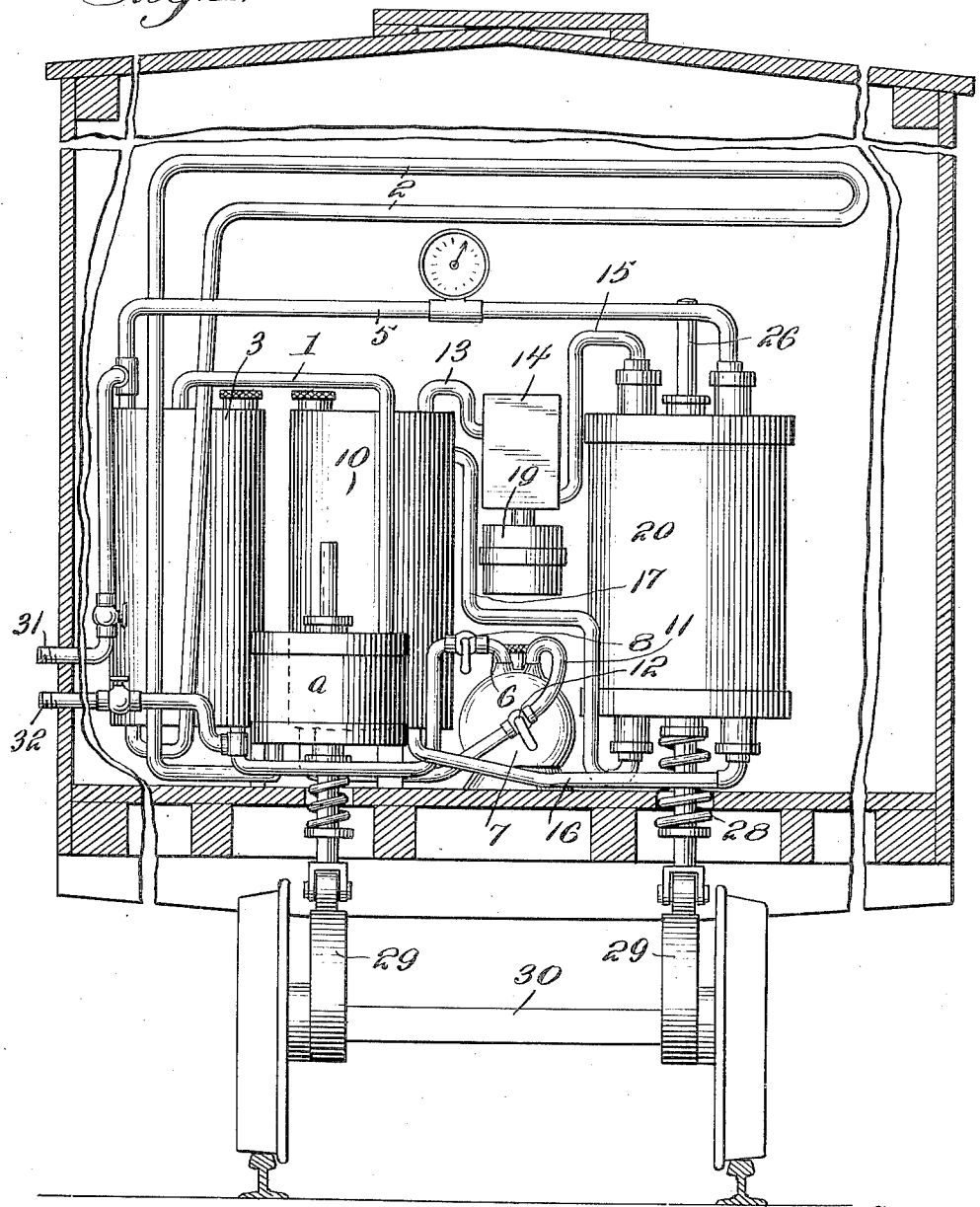

C. A. HUSE.
REFRIGERATOR CAR.
APPLICATION FILED APR. 19, 1912.

1,098,904.

Patented June 2, 1914.

2 SHEETS—SHEET 1.

Witnesses

Inventor
Charles A Huse,
By Victor J. Evans,
Attorney

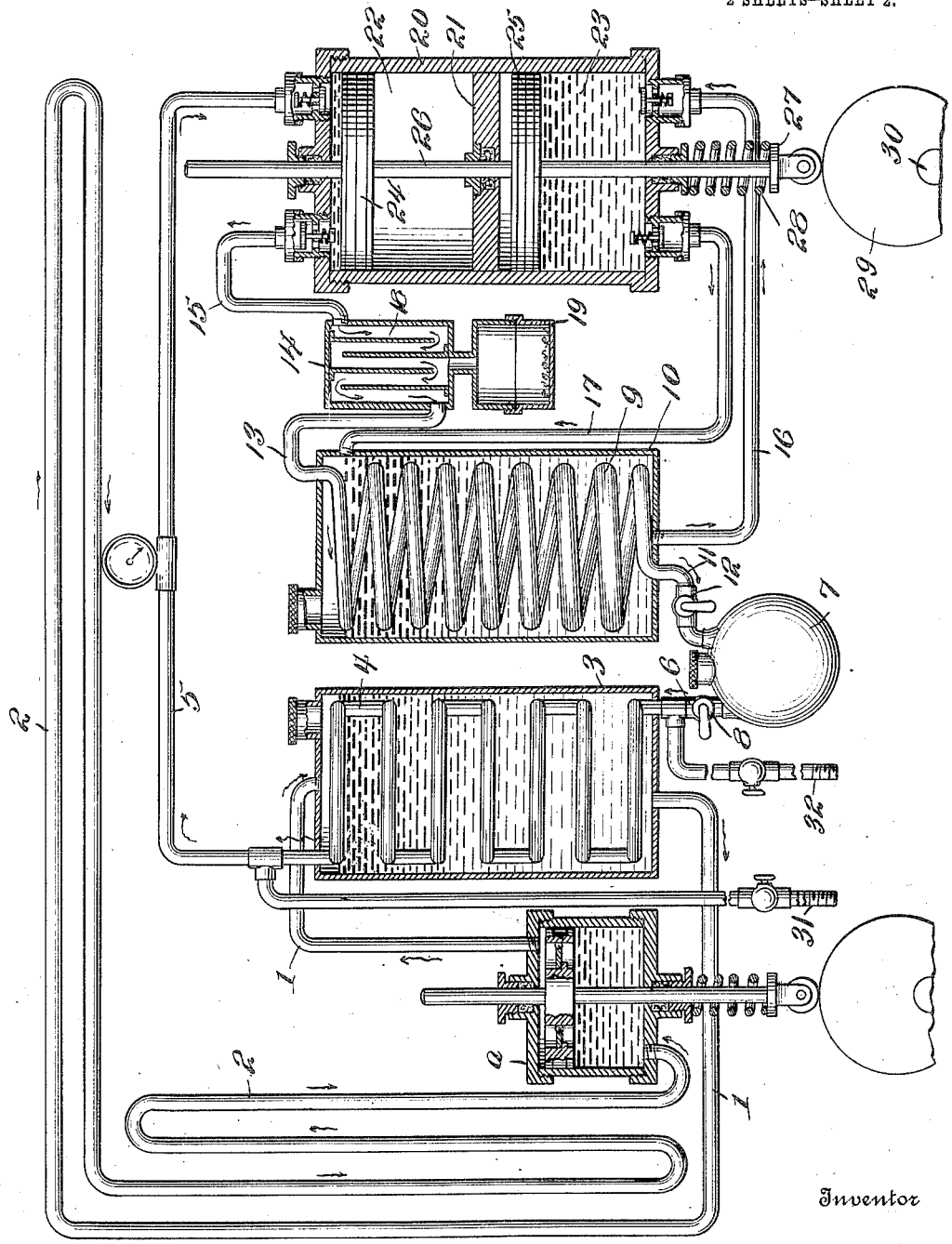

UNITED STATES PATENT OFFICE.

CHARLES A. HUSE, OF PHILADELPHIA, PENNSYLVANIA, ASSIGNOR OF ONE-HALF TO LINWOOD L. HALLMAN, OF PHILADELPHIA, PENNSYLVANIA.

REFRIGERATOR-CAR.

1,098,904.

Specification of Letters Patent.  Patented June 2, 1914.

Application filed April 19, 1912. Serial No. 691,800.

*To all whom it may concern:*

Be it known that I, CHARLES A. HUSE, a citizen of the United States, residing at Philadelphia, in the county of Philadelphia and State of Pennsylvania, have invented new and useful Improvements in Refrigerator-Cars, of which the following is a specification.

Cars used in the transportation of perishable articles such as meat, fruit and vegetables are generally cooled by blocks of ice placed in storage chambers, such cars in transit being supplied with ice at determinate stations. These storage chambers occupy valuable space and the hauling of the blocks of ice entails some considerable expense.

The present invention is primarily designed to secure a maximum amount of storage space for the perishable products or articles to be transported and to save the expense incident to the haulage of the blocks of ice. These advantages are attained by the provision of a refrigerating plant and the installation of the same in the car in such a manner as to occupy but very little space, said refrigerating plant being operated from a moving part of the car such as a cam on the axle of a set of wheels, said plant being also designed to be coupled to a local refrigerating plant should the car in transit be delayed at any point *en route*.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a detail view, showing the application of the invention to a refrigerating car. Fig. 2 is a sectional view of the refrigerating plant.

Corresponding and like parts are referred to in the following description, and indicated in all the views of the drawings, by the same reference characters.

The refrigerating plant has its parts compactly arranged so as to be located in a small space and not be in the way. The plant is of the type utilizing ammonia as the cooling agent, said ammonia being alternately condensed and allowed to expand, the expansion coil being located in a tank containing brine or like liquid which is circulated through a cooling coil.

In the accompanying drawings the numeral 1 designates the pipe through which the brine or other cooling medium is circulated, said pipe having any number of coils 2 in its length for reducing the temperature within the car. The cooling coils may be arranged in any manner within the car so as to obtain the best possible results. A pump A or other means may be provided in the length of the pipe 1 to insure a circulation of the brine or cooling medium therethrough. The brine or cooling agent is contained in a tank 3 and the pipe 1 has connection with the upper and the lower portions of said tank so as to insure circulation of the brine through the tank. An expansion coil 4 is located in the tank 3 and is immersed in the brine or other cooling liquid agent contained therein. A pipe 5 connects the upper end of the expansion coil 4 with the cylinder of a compressor. A pipe 6 connects the lower end of the expansion coil 4 with a reservoir or container 7 which holds the ammonia in liquid form, a valve 8 being located in the length of the pipe 6. A condensing coil 9 is arranged in a tank 10 and its lower end is connected by means of a pipe 11 with the container 7, the pipe 11 having a valve 12. A pipe 13 connects the upper end of the condensing coil 9 with the lower end of a separator 14. A pipe 15 connects the separator 14 with the cylinder of the compressor. The tank 10 is adapted to receive a quantity of water. A pipe 16 connects the bottom or lower portion of the tank 10 with the cylinder of a pump. A pipe 17 connects the upper portion of the tank 10 with the cylinder of said pump. When the pump is in operation the water is drawn from the bottom of the tank 10 and is delivered into the upper portion of said tank and this circulation of the water cools the condensing coil 9. The pipes 16 and 17 may be of any length to insure a cooling of the water in its circulation therethrough, said pipes in effect constituting a radiator for diffusing the heat contained in the water in its passage therethrough so that said water is cooled sufficiently when returned to the tank 10 for absorbing the heat given off by the ammonia in its condensation while passing through the condensing coil 9.

The separator 14 consists of a chamber in which are placed baffles 18. The pipe 15 terminates within the upper portion of the separating chamber opposite the baffles 18 to deliver the compressed ammoniacal gases thereon so as to insure a thorough separation of all impurities, which latter are precipitated and collect in a trap 19 connected with the bottom of the separator. The impurities collecting in the trap 19 are drawn off from time to time.

The compressor and circulating pump are formed together and embody a cylinder 20 in common. A partition 21 subdivides the cylinder into two chambers 22 and 23, the chamber 22 receiving the piston 24 of the compressor and the chamber 23 receiving the piston 25 of the circulating pump, the two pistons being connected by means of a stem 26, which passes through openings formed in the partition 21 and in the heads or ends of the cylinder 20. The pistons 24 and 25 have a snug fit within their respective chambers. A collar 27 is provided upon the lower portion of the stem 26 and a helical spring 28 of the expansible type is mounted upon the stem 26 and confined between the collar 27 and the lower end of the cylinder 20 and normally tends to press the stem and the pistons carried thereby downwardly. The lower end of the stem 26 extends within the path of a cam 29 attached to one of the car axles 30. When the car is in motion the pistons 24 and 25 are pressed upwardly by means of the cam 29 riding upon the lower end of the stem 26, the stem and pistons being pressed downwardly by means of the spring 28.

When installing the invention in a car the component parts are arranged so as to be out of the way and to occupy the smallest space possible, thereby admitting of a maximum amount of storage space being available for receiving the perishable goods to be transported. The liquid ammonia is placed in the container 7. The tank 10 is supplied with water. The tank 3, pipe 1 and cooling coils are filled with brine or other liquid agent which when cooled is circulated through the cooling coils. When the car is detained at a station and it is required to cool the same the expansion coil 4 may be connected with the refrigerating plant at such station by means of pipes 31 and 32, each of which is provided with a valve. The pipe 31 has connection with the upper portion of the expansion coil 4, whereas the pipe 32 has connection with the lower portion of the expansion coil. When the car is in motion both the compressor and the circulating pump are set in operation, the pump drawing the water from the bottom of the tank 10 into the chamber 23 and delivering it from said chamber into the upper portion of the tank 10, thereby cooling the condensing coil 9. The compressor draws the ammoniacal gases from the upper end of the expansion coil into the chamber 22 and delivers said gases from said chamber into the separator 14 and from thence into the condensing coil 9, the liquid ammonia passing from the lower end of the condensing coil into the container 7 and from said container into the lower end of the expansion coil, which latter is cooled by the expansion of the ammonia, thereby cooling the brine in the tank 3, said brine in turn being caused to circulate through the cooling coil or coils in the manner well understood, with the result of reducing the temperature within the car to the proper degree according to the commodity, product or article to be cooled during transportation.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In a refrigerator plant utilizing ammonia, the combination of an expansion coil, a condenser, a water cooling tank receiving the condenser, a combined compressor and circulating pump embodying a cylinder, a partition dividing the cylinder into two chambers, connected pistons arranged to operate within the respective chambers of the cylinder, actuating means for operating the pistons, a valve controlled pipe connecting the condenser with an end of one of the said chambers, and other valve controlled pipes connecting opposite ends of the said tank with an end portion of the other chamber.

2. In a refrigerator plant utilizing ammonia, the combination of an expansion coil, a condensing coil, a container intermediate of the two coils and in communication with the lower ends thereof and adapted to receive liquid ammonia, a tank containing the condensing coil, a condensing and circulating pump comprising a cylinder divided by means of a partition into chambers, connected pistons arranged to operate in the respective chambers, valved pipes connecting one of the chambers with opposite ends of the beforementioned tank for circulating water therethrough, a valved pipe connecting an end of the other chamber with an end of the expansion coil, a second valved pipe connecting an end of the condensing coil with the chamber of the cylinder having connection with the expansion coil, a separator in the length of the pipe between the condensing coil and compressor and a trap connected with the lower end of the separator.

3. In a refrigerating plant utilizing ammonia, the combination of a cooling coil, a tank for receiving the cooling medium and having the cooling coil interposed in the length thereof, a pump for circulating the cooling medium through the tank and coil, an expansion coil located in the cooling tank, a condensing coil, a container for liquid ammonia having the lower ends of the condensing and expansion coils in communication therewith, a tank receiving the condensing coil, a combined compressor and circulating pump comprising a chambered cylinder having connected pistons arranged to operate therein, valved pipes connecting an end of the chamber of the circulating pump with opposite ends of the tank containing the condensing coil, and other valved pipes connecting the chamber of the compressor with the expansion and condensing coils, the pipe connecting the compressor with the condensing coil having a separator and trap in the length thereof.

In testimony whereof I affix my signature in presence of two witnesses.

CHARLES A. HUSE.

Witnesses:
 LINWOOD L. HALLMAN,
 JASPER D. OGDEN.